US008851372B2

(12) United States Patent
Zhou et al.

(10) Patent No.: US 8,851,372 B2
(45) Date of Patent: Oct. 7, 2014

(54) WEARABLE PERSONAL DIGITAL DEVICE WITH CHANGEABLE BENDABLE BATTERY AND EXPANDABLE DISPLAY USED AS STANDALONE ELECTRONIC PAYMENT CARD

(71) Applicants: Tiger T G Zhou, Tiburon, CA (US); Dylan T X Zhou, San Gabriel, CA (US); Andrew H B Zhou, Tiburon, CA (US)

(72) Inventors: Tiger T G Zhou, Tiburon, CA (US); Dylan T X Zhou, San Gabriel, CA (US); Andrew H B Zhou, Tiburon, CA (US)

( * ) Notice: Subject to any disclaimer, the term of this patent is extended or adjusted under 35 U.S.C. 154(b) by 0 days.

(21) Appl. No.: 14/272,939

(22) Filed: May 8, 2014

(65) Prior Publication Data
US 2014/0239065 A1   Aug. 28, 2014

Related U.S. Application Data (63) Continuation-in-part of application No. 13/760,214, filed on Feb. 6, 2013, and a continuation-in-part of application No. 13/185,491, filed on Jul. 18, 2011, and a continuation-in-part of application No. 13/875,311, filed on May 2, 2013, and a continuation-in-part of application No. 13/620,775, filed on Sep. 15, 2012, and a continuation-in-part of application No. 13/661,207, filed on Oct. 26, 2012, now abandoned, and a continuation-in-part of application No. 13/973,146, filed on Aug. 22, 2013, and a continuation-in-part of application No. 13/776,852, filed on Feb. 26, 2013, and a continuation-in-part of application No. 13/287,279, filed on Nov. 2, 2011, and a continuation-in-part of application No. 13/646,706, filed on Oct. 7, 2012.

(51) Int. Cl.
| | | |
|---|---|---|
| *G06K 5/00* | (2006.01) | |
| *G06K 7/00* | (2006.01) | |
| *G06K 7/08* | (2006.01) | |
| *H04B 7/00* | (2006.01) | |
| *G06Q 20/34* | (2012.01) | |

(52) U.S. Cl.
CPC ........................................ *G06Q 20/34* (2013.01)
USPC ........... 235/380; 235/439; 235/449; 235/451; 455/41.3; 455/66.1

(58) Field of Classification Search
USPC ........ 235/380, 435, 449, 451; 455/66.1, 41.2, 455/41.3, 566
See application file for complete search history.

(56) References Cited

U.S. PATENT DOCUMENTS

| | | | | |
|---|---|---|---|---|
| 4,236,239 A | * | 11/1980 | Imgruth et al. | 368/72 |
| 4,412,751 A | * | 11/1983 | Jeannet et al. | 368/276 |
| 5,241,161 A | * | 8/1993 | Zuta | 235/382 |
| 5,416,730 A | * | 5/1995 | Lookofsky | 361/679.09 |
| 5,650,945 A | * | 7/1997 | Kita | 702/1 |

(Continued)

*Primary Examiner* — Daniel Walsh
(74) *Attorney, Agent, or Firm* — Patent Jurist; Georgiy L. Khayet (57) ABSTRACT

Provided is a wearable personal digital device and methods for enlarging display space using the wearable personal digital device. The wearable personal digital device may comprise a processor, a memory unit, an expandable display, a camera, a projector, a communication circuit, a swipe card reader, one or more biometric sensors, one or more accelerometers, a housing, and a band. The expandable display is be communicatively coupled to the processor and configured to expand to enlarge display space using a flip up portion, detachable portion, or bending the expandable display. The band may include one or more rechargeable batteries configured to power the wearable personal digital device. Biometric sensors and accelerometers provide data for monitoring health and activity of the user. The swipe card reader is configured to read payment card data.

30 Claims, 7 Drawing Sheets

(56) References Cited

U.S. PATENT DOCUMENTS

| | | | |
|---|---|---|---|
| 6,158,884 A * | 12/2000 | Lebby et al. | 368/282 |
| 6,477,117 B1 * | 11/2002 | Narayanaswami et al. | 368/251 |
| 6,556,222 B1 * | 4/2003 | Narayanaswami | 715/786 |
| 6,619,835 B2 * | 9/2003 | Kita | 368/281 |
| 6,714,233 B2 * | 3/2004 | Chihara et al. | 348/14.02 |
| 7,398,151 B1 * | 7/2008 | Burrell et al. | 701/410 |
| 8,014,635 B2 * | 9/2011 | Kondo | 382/312 |
| 8,275,327 B2 * | 9/2012 | Yi et al. | 455/90.3 |
| 8,279,716 B1 * | 10/2012 | Gossweiler et al. | 368/10 |
| 8,467,270 B2 * | 6/2013 | Gossweiler et al. | 368/10 |
| D701,504 S * | 3/2014 | Christopher et al. | D14/344 |
| D703,204 S * | 4/2014 | Riddiford et al. | D14/344 |
| 8,725,842 B1 * | 5/2014 | Al-Nasser | 709/219 |
| 2001/0017663 A1 * | 8/2001 | Yamaguchi et al. | 348/373 |
| 2002/0012292 A1 * | 1/2002 | Mitamura | 368/281 |
| 2005/0265125 A1 * | 12/2005 | Yoshida et al. | 368/10 |
| 2008/0037375 A1 * | 2/2008 | Ellner et al. | 368/88 |
| 2008/0318636 A1 * | 12/2008 | Kim | 455/566 |
| 2009/0069045 A1 * | 3/2009 | Cheng | 455/556.1 |
| 2009/0219788 A1 * | 9/2009 | Henley, Jr. | 368/13 |
| 2010/0112964 A1 * | 5/2010 | Yi et al. | 455/90.3 |
| 2010/0124949 A1 * | 5/2010 | Demuynck et al. | 455/569.1 |
| 2010/0219943 A1 * | 9/2010 | Vanska et al. | 340/407.1 |
| 2011/0012796 A1 * | 1/2011 | Kim et al. | 343/702 |
| 2011/0014956 A1 * | 1/2011 | Lee et al. | 455/569.1 |
| 2011/0059769 A1 * | 3/2011 | Brunolli | 455/556.1 |
| 2011/0059771 A1 * | 3/2011 | Kondo | 455/556.2 |
| 2011/0205851 A1 * | 8/2011 | Harris | 368/14 |
| 2012/0016793 A1 * | 1/2012 | Peters et al. | 705/39 |
| 2012/0258692 A1 * | 10/2012 | Luk | 455/414.1 |
| 2013/0107674 A1 * | 5/2013 | Gossweiler et al. | 368/10 |
| 2013/0146659 A1 * | 6/2013 | Zhou et al. | 235/380 |
| 2013/0163390 A1 * | 6/2013 | Gossweiler et al. | 368/14 |
| 2013/0216065 A1 * | 8/2013 | Nguyen | 381/94.1 |
| 2014/0036643 A1 * | 2/2014 | Messenger et al. | 368/251 |
| 2014/0077946 A1 * | 3/2014 | Tran | 340/539.13 |
| 2014/0120983 A1 * | 5/2014 | Lam | 455/557 |
| 2014/0143064 A1 * | 5/2014 | Tran | 705/14.66 |

* cited by examiner

WEARABLE PERSONAL DIGITAL DEVICE WITH CHANGEABLE BENDABLE BATTERY AND EXPANDABLE DISPLAY USED AS STANDALONE ELECTRONIC PAYMENT CARD

CROSS-REFERENCE TO RELATED APPLICATIONS

This application is a continuation-in-part of U.S. patent application Ser. No. 13/760,214, entitled "WEARABLE PERSONAL DIGITAL DEVICE FOR FACILITATING MOBILE DEVICE PAYMENTS AND PERSONAL USE," filed on Feb. 6, 2013, U.S. patent application Ser. No. 13/776,852, entitled "WEARABLE PERSONAL DIGITAL FLEXIBLE CLOUD GAME, MULTIMEDIA, COMMUNICATION AND COMPUTING DEVICE," filed on Feb. 26, 2013, U.S. patent application Ser. No. 13/875,311, entitled "FACILITATING MOBILE DEVICE PAYMENTS USING MOBILE PAYMENT ACCOUNT, MOBILE BARCODE AND UNIVERSAL DIGITAL MOBILE CURRENCY," filed on May 2, 2013, U.S. patent application Ser. No. 13/620,775, entitled "METHODS AND SYSTEMS FOR FACILITATING MOBILE DEVICE PAYMENTS USING CODES AND CASHBACK BUSINESS MODEL," filed on Sep. 15, 2012, U.S. patent application Ser. No. 13/661,207, entitled "METHODS AND SYSTEMS FOR RECEIVING COMPENSATION FOR USING MOBILE PAYMENT SERVICES," filed on Oct. 26, 2012, U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND," filed on Aug. 22, 2013, U.S. patent application Ser. No. 13/646,706, entitled "METHODS AND SYSTEMS FOR PREVENTING CARD PAYMENT FRAUD AND RECEIVING PAYMENTS USING CODES AND MOBILE DEVICES," filed on Oct. 7, 2012, U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, and U.S. patent application Ser. No. 13/185,491, entitled "FACILITATING MOBILE DEVICE PAYMENTS USING PRODUCT CODE SCANNING", filed on Jul. 18, 2011, which are incorporated herein by reference in their entirety.

FIELD

This application relates generally to personal mobile devices and, more specifically, to wearable personal digital device with expandable display and bendable battery where the expandable display can be used an electronic or virtual payment card.

BACKGROUND

Mobile devices gain growing importance in daily activities of their users with more and more functions being performed by mobile devices. Some of such functions may include mobile communication, mobile payments, health monitoring, and so forth. In addition to that, carrying a mobile phone, tablet PC, or laptop may not always be comfortable. For example, during physical activity or leisure time. While using wearable mobile devices, e.g. wristwatch phones, may be inconvenient because of insufficient display size limiting the volume of data that can be shown and impeding user interaction with the device.

Furthermore, small size of wearable mobile phones provides little space for a battery, so conventional devices have low capacity batteries restricting lifetime of the wearable mobile devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a device and methods for enlarging display space using a wearable personal digital device. The wearable personal digital device may be a device for communication, mobile payments, health monitoring, and data sharing. The wearable personal digital device may be worn on a wrist, arm, neck, and other part of the body of a user. The wearable personal digital device may comprise a watch module, a processor, a memory unit, a battery, an expandable screen, a camera, a projector, a communication circuit, a swipe card reader, one or more biometric sensors, one or more accelerometers, a housing, and a band. The expandable display may be communicatively coupled to the processor and configured to expand to enlarge display space. The expandable display may be a touchscreen display configured to enable user interaction through touch. Various embodiments of the expandable display may include a flip up display, a detachable display, and a bendable display. In some embodiments, the expandable screen may include a bendable display that can be bent around a wrist of the user or bent together to minimize the display size while not in use.

To facilitate interaction with the wearable personal digital device, the display may be expanded by flipping up the display or attaching a detachable display portion in a front or rear part of the device. Additionally, the wearable personal digital device may facilitate mobile payments due to a swipe card reader to read data of a payment card to be used to make or receive payment.

Furthermore, the battery may be included in the band thus allowing more space for battery accommodation.

The wearable personal digital device may be used as a personal health and fitness monitor. Due to accelerometers, the wearable personal digital device may track activity and energy expenditures of the user and monitor biometric parameters, such as blood pressure, pulse, hart rate, arterial properties, and so forth.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

A wearable personal digital device with an expandable display and related methods are described herein. The display of the wearable personal digital (WPD) device may be configured to expand through flip-up, attaching an additional display portion, unbending the display, and so forth. By expanding the display, a common enlarged display space is created. The enlarged display space facilitates user interaction with the device by providing more space for displaying data. Additionally, the WPD device may include a band coupled to the display. The band may include one or more rechargeable batteries to power the WPD device. Thus, the life time of the WPD device may be increased.

Furthermore, the WPD device may perform a function of a health and activity monitor. The WPD device may sense biometric data associated with the user (blood pressure, pulse, heart rate, and so forth) using one or more sensors and/or receive data on user movements using a GPS module and/or one or more accelerometers. Biometric data and user movement data may be shown of the display of the WPD device, stored in the memory of the WPD device, and/or processed by the processor of the WPD device to produce historical or averaged data.

Figure 1:
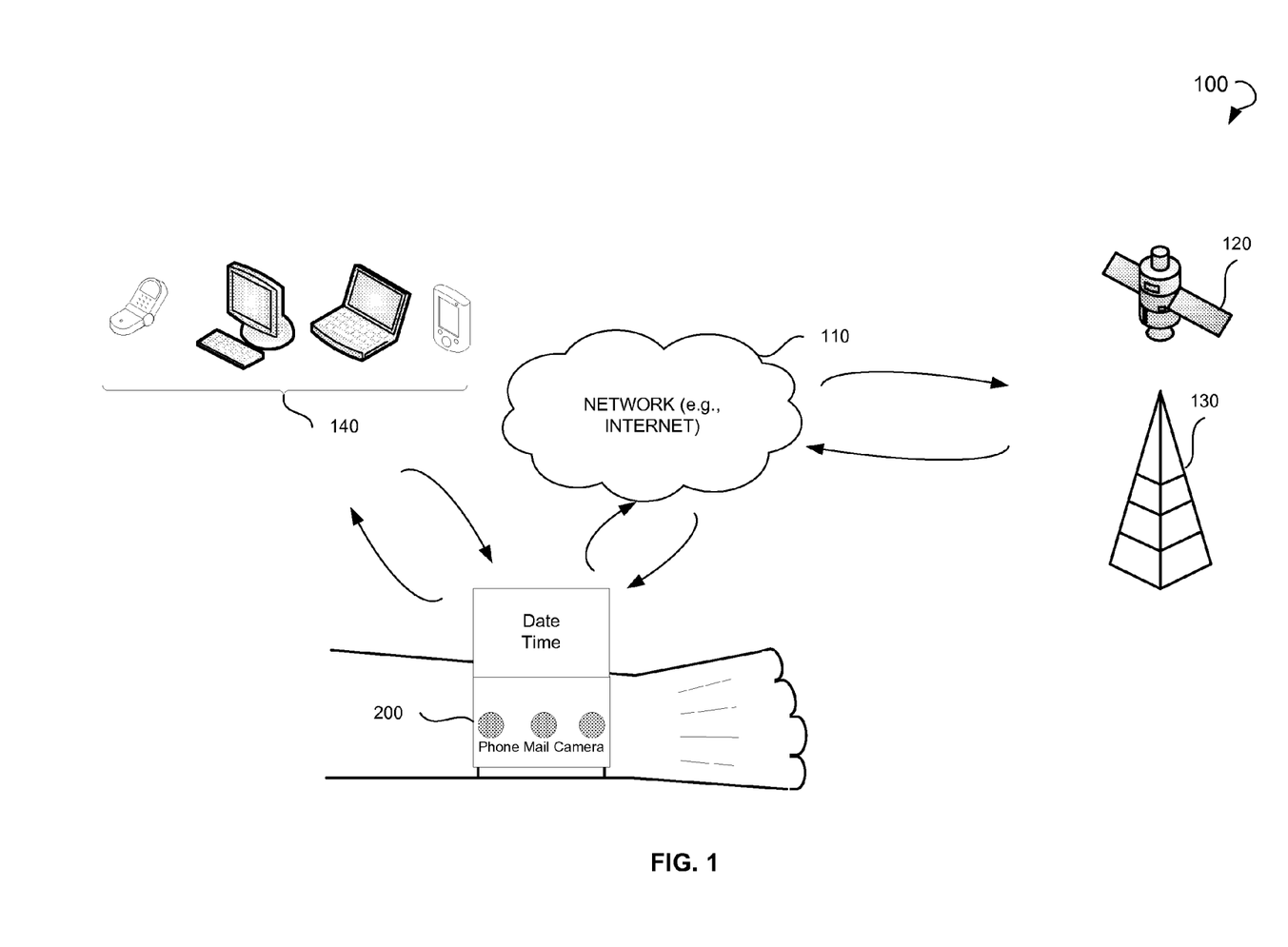
FIG. 1 illustrates an environment within which the wearable personal digital device and methods for enlarging display space using the wearable personal digital device can be implemented, in accordance with some embodiments.

Referring now to the drawings, FIG. 1 illustrates an environment 100 within which the WPD device 200 and methods for enlarging display space of the wearable personal digital device 200 can be implemented. The environment 100 may include a network 110, a wearable personal digital (WPD) device 200, a mobile base station 130, a GSM satellite 120, and one or more external devices 140. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication. The WPD device 200 may communicate with the GPS satellite via the network 110 to exchange data on a geographical location of the WPD device 200. Additionally, the WPD device 200 may communicate with mobile network operators using the mobile base station 130.

For the purposes of communication, the WPD device 200 may be compatible with one or more of the following network standards: GSM, CDMA, LTE, IMS, Universal Mobile Telecommunication System (UMTS), 4G, 5G, 6G and upper, RFID, and so forth.

Figure 2:
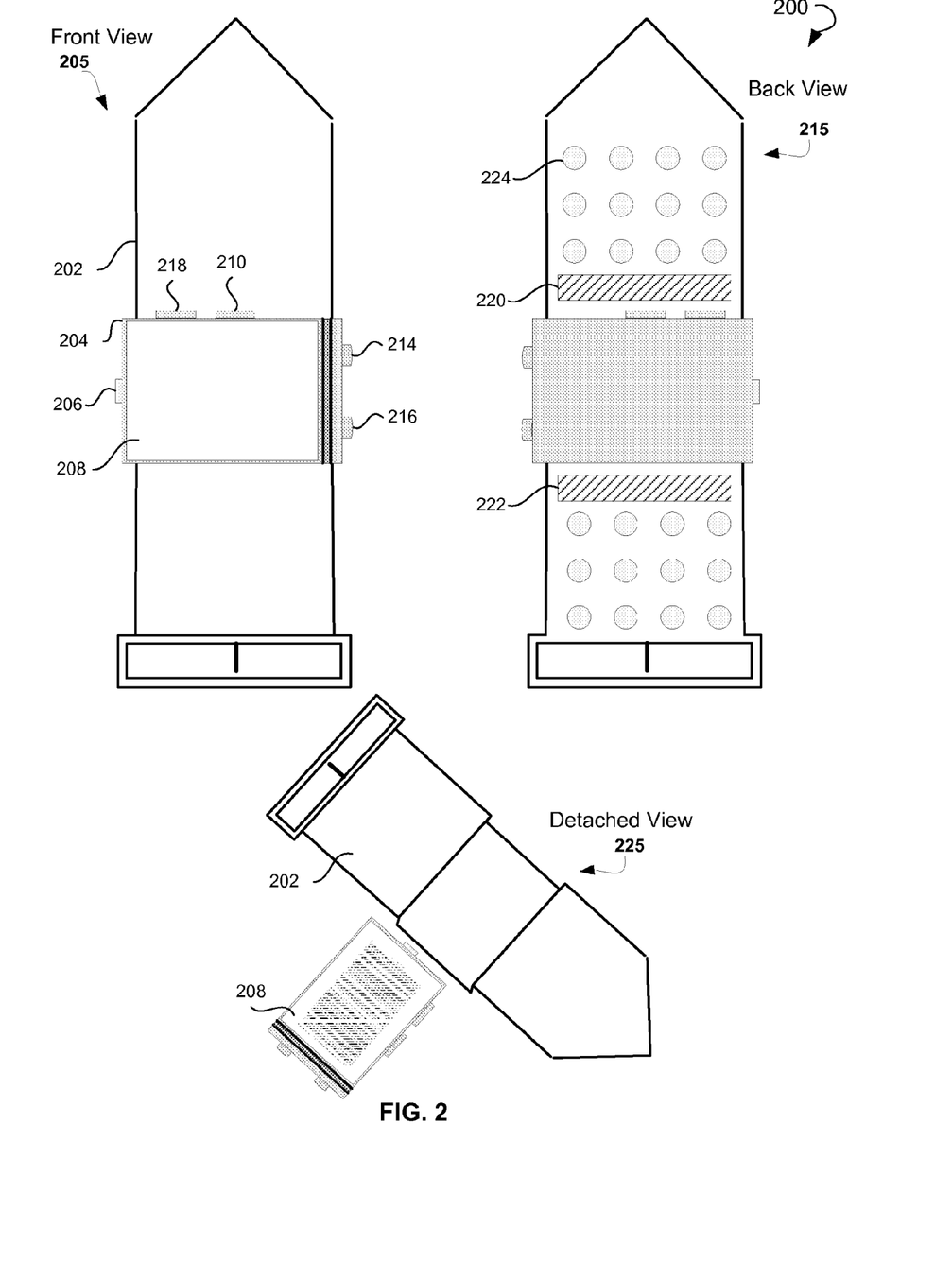
FIG. 2 illustrates an example of the wearable personal digital device, in accordance with some embodiments.

FIG. 2 illustrates an example of the WPD device 200 in accordance to some embodiments. As shown on a front view 205 and a back view 215 of FIG. 2, the WPD device 200 may comprise a housing 204, which encloses a processor (not shown), a memory unit (not shown), a communication circuit (not shown), a connection port 206, an expandable display 208, a swipe card reader 212, one or more control elements 214, 216, a camera 218, a projector 210, and a band 202.

Figure 3:
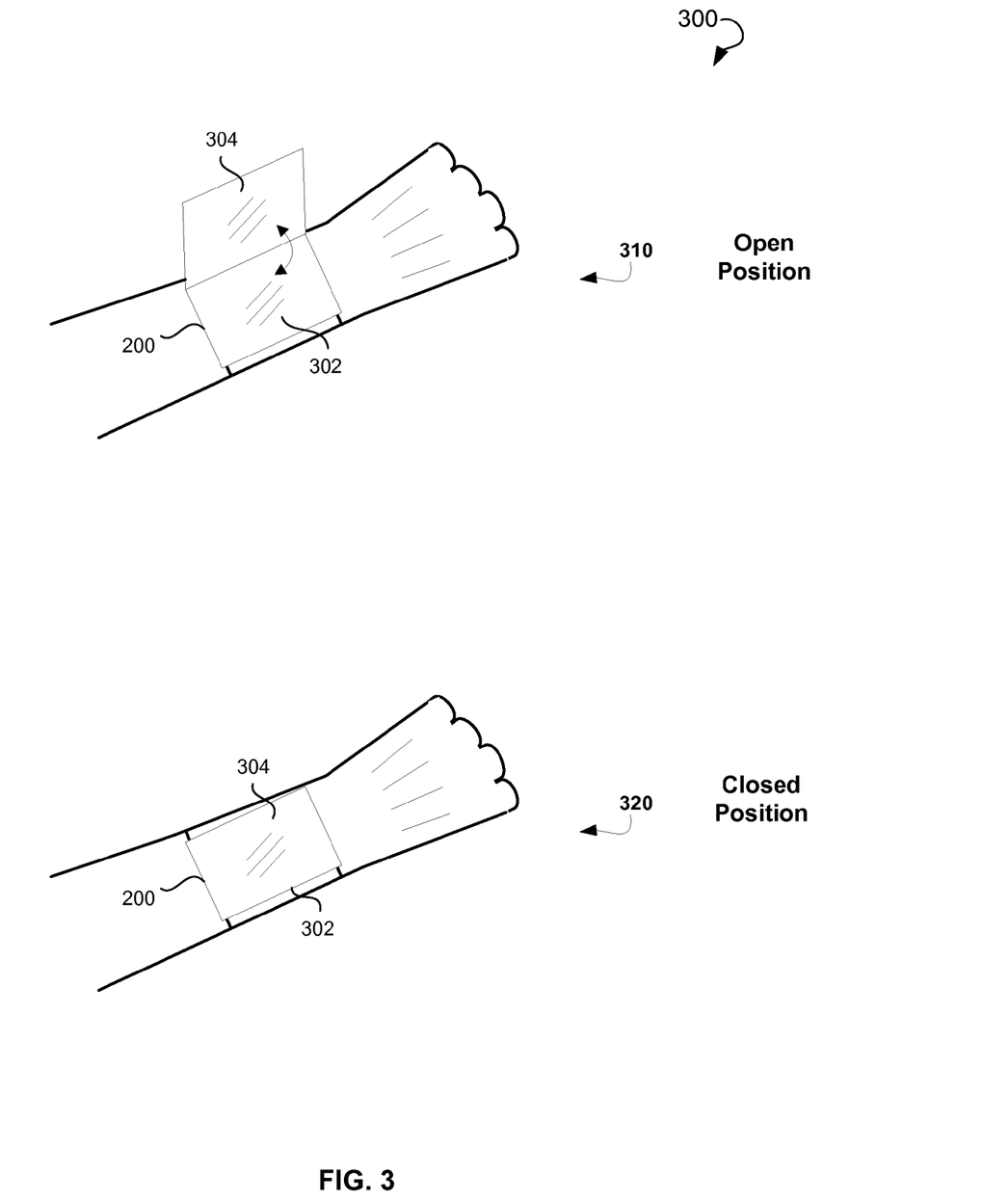
FIG. 3 illustrates an example of a flip up expandable display of the wearable personal digital device, in accordance with some embodiments.

The expandable display 208 may be configured to enlarge display space through various ways that will be described in detail with reference to FIGS. 3-5. The expandable display 208 may include a touchscreen display or any other type of display configured to enable user interaction with the device through touch. The expandable display 208 may be communicatively coupled to the processor and configured to graphically display data transmitted by the processor. The processor may communicate with the memory unit, camera 218, projector 210, control elements 214, 216, connection port 206, and swipe card reader 212. The local processing may be performed by the processor using various software applications installed on the WPD device 200. The processor may be further configured to download applications, receive and send text, video, multimedia data.

The projector 210 may be configured to project a virtual display on any surface in proximity to the WPD device 200. The user may interact with the virtual display through movements of hands, arms, fingers, and so forth. For example, movements of user's fingers may be captured by the camera 218 and processed by the processor in relation to the virtual display. Thus, user commands through the virtual display may be received.

The camera 218 may be communicatively coupled to the processor and configured to capture photos, record video, and so forth. Additionally, the camera may be further configured to capture one or more barcodes. The one or more barcodes may include electronic key data, a link to a web-resource, a payment request, advertising information, and other information. In some embodiments, the camera 210 may be detachable and pluggable to a digital eyeglass device. The one or more barcodes include a linear dimensional code, a two-dimensional code, a snap tag code, and a QR code, and other machine readable code.

The WPD device 200 may have wireless communication capabilities enabled using at least the communication circuit. The communication circuit may be communicatively coupled to the processor and configured to communicate with one or more external devices via a network wirelessly of by wires using one or more of the following: a Bluetooth module, a WiFi module, the communication port 206, including a universal serial bus (USB) port, a parallel port, an infrared transceiver port, a radiofrequency transceiver port, and so forth. The WPD device 200 may have internet connectivity using cellular networks (e.g., 3G, 4G) as well as Wi-Fi and other types of networks. Some additional examples of such networks are GSM, CDMA, LTE, IMS, Universal Mobile Telecommunication System (UMTS), RFID, 4G, 5G, 6G and upper.

The WPD device 200 may further comprise an operating system executing on the processor. The operating system may include Android, iOS, Firefox OS, wearable OS, and so forth.

The one or more control elements 214, 216 may include buttons, wheels, sliders, and so forth. The one or more control elements 214, 216 may be used to control operation or functions of the WPD device 200.

Additionally, the WPD device 200 may include the swipe card reader 212 to read payment cards data. The swipe card reader 212 may be located on either side of the WPD device 200, vertically or horizontally. Using the swipe card reader 212, the user may make or receive payments in a secure manner. Furthermore, the WPD device 200 may enable a Bluetooth low energy payment. Therefore, a user does not even have to speak to a cashier or visit a cash register to make a purchase, the user can scan the code of the product and hit purchase button of the relative application of the WPD device 200.

In an example embodiment, when the user checks online at the store, the user name and photo can appear on a device associated with the store, such as a Point-of-Sale (POS) system. The user can use the WPD device 200 to pay for the products via universal digital mobile currency face verification. The cashier can complete the transaction by clicking on the profile picture of the user on the POS system.

In an example embodiment, the WPD device 200 is associated with one or more of the following: a transactional payment based on Unstructured Supplementary Service Data (USSD), Short Message Service (SMS), direct operator billing, a credit card mobile payment, an online wallet, a QR code payment, contactless near field communication, a cloud-based mobile payment, an audio signal-based payment, a Bluetooth Low Energy (BLE) signal beacon payment, an in-application payment, an SDK payment, an API payment, a social networking payment, a direct carrier and bank co-operation, and so forth.

The band 202 may be attached to the housing to and adapted to secure the WPD device 200 on a body or clothes of the user. In various embodiments, the WPD device 200 may be secured on a wrist, an arm, a neck, a head, a leg, a waist, an ear, a finger, or any other part of the human body, or on any part of the clothes of the user. The band 202 may be adapted to secure the WPD device 200 under, within or on clothing. The band 202, in various embodiments, may be implemented in various materials and/or configurations. The band 202 may be an expansion bracelet, one piece band, two piece band, and so forth. In some embodiments the band 202 may include a clasp adapted to fix the band 202 in a specific position to secure the WPD device 200 around the wrist. The clasp may include various types of clasps, buckles, tongue clasps, lobster claws, toggle clasps, Velcro, and so forth.

The band 202 may include a rechargeable battery to power the WPD device 200. The battery can include at least silicon polymer and stainless steel and be hypoallergenic, lightweight, and wear-resisting. The band can be configured to adjust a band size for snug engagement. In various embodiments, the battery is bendable, includes a plurality of button batteries 224, a curved battery, a stepped battery, a cable battery, or otherwise configured to ensure comfortable wearing.

The curved battery is not bendable. The battery of this type is rigid, however, it is molded into curved shapes to complement curved screens and form factors.

The stepped battery includes two or more batteries that are joined together like steps. This allows the battery to fit into tight or irregular spaces that could not house standard, rectangular batteries, and the design allows for a certain increase in storage capacity.

The cable battery is extremely bendable. Moreover, the cable battery is waterproof and resistant to overheating. Such batteries are difficult to break because they adjust to body movements and absorb impact.

Instead of using an expensive electronic printing technique for flexible batteries, standard battery electrochemical architectures can be adapted to flexible materials. For example, the base of the battery can be a flexible plastic, but the carbon nanotubes and other nanoparticles can serve as active components in the battery. The cathode, anode, and even the electrolyte can be composed of nanoparticles in a semi-solid paste.

Alternatively, the battery can include a thin-film lithium-ion battery. A high-performance lithium-ion flexible battery can be bendable and fully-fledged flexible. Such batteries are built by sequentially depositing several layers (a current collector, a cathode, an electrolyte, an anode, and a protective layer) on a brittle substrate made of mica. Then, the mica is manually delaminated using adhesive tape, and the battery is enclosed between two polymer sheets to improve mechanical resistance.

Another alternative is a sodium ion battery with flexible molybdenum disulfide electrodes. The sodium ion battery can be made of interleaved molybdenum disulfide and grapheme nanosheets, which can be both an active material to efficiently store sodium atoms and a flexible current collector. In some cases, a composite paper can be used as a negative electrode in sodium-ion batteries.

In some embodiments, one or more solar cells may be disposed on the outer surface of the band 202. The solar cells may be electrically connected to a battery of the WPD device 200 and may be configured to charge the battery of the WPD device 200. In other embodiments, the WPD device 200 may be configured to charge using natural movement vibrations, for example, when the user walks, is jogging, makes exercises, and so forth. In yet other embodiments, the WPD device 200 may charge wirelessly using an external wireless charger accessory.

In various embodiments, the WPD device 200 may be metal-banded, leather banded, plastic-banded, jewelry-banded, rimmed by jewelry and/or diamonds on a bezel, rimmed by jewelry and/or diamonds on an edge of the display, and so forth.

In some embodiments, the WPD device 200 may include one or more accelerometers to track activity of the user for purposes of monitoring energy expenditures or calories burned, evaluating sleep quality, calculating breaths per minute, snoring breaks, steps and/or distance walked, and so forth.

Additionally, the WPD device 200 may sense biometric parameters, such as blood pressure, pulse, hart rate, arterial properties of the user, the quality of sleep, using one or more sensors 220, 222. The one or more sensors 220, 222 may include one or more of the following: a heartbeat rate meter, a glucose level meter, a pressure sensor, body temperature meter, environment temperature meter, one lead EGO, and so forth. The biometric parameters sensed by the one or more sensors 220, 222 may be shown on the display 208, stored to the memory, and/or processed by the processor to receive historical or averaged biometric data. In various embodiments, the one or more sensors 220, 222 may be located in various locations such as to ensure a secure contact with the user skin or to avoid it depending on the parameter sensed by a sensor.

Furthermore, the band 202 may be adapted to be filled with air to perform blood pressure measuring and may include a pressure adjustment device. The band 202 may be detachable and changeable with an additional band including an additional battery. FIG. 2 shows a detached view 225 that represents the band 202 detached from the expandable display 208.

In some embodiments, access to the WPD device 200 may be protected by a password, a Personal Identification Number (PIN) code, biometric authorization, and so forth. Biometric authorization may be performed using one or more biometric sensors and may include fingerprint scanning, palm scanning, face scanning, retina scanning, and so forth. In some embodiments, fingerprint scanning may be performed using a fingerprint reader integrated in the WPD device 200 or detachably connected to the WPD device. The scanned fingerprint may be matched to one or more approved fingerprints stored in the memory of the WPD device 200. The access to the device may be granted if the scanned fingerprint matches one of the stored fingerprints, otherwise access may be denied.

In certain example embodiments, the WPD device 200 may sense and track position of the user to control snoring of the user by means of one or more accelerometers and/or biometric sensors.

In further embodiments, the WPD device 200 may be used to record, send, receive, and review texts, images, video, audio, photo, multi-media, and other data.

The WPD device 200 may further include a GPS module (not shown) configured to track geographical location of the device. Such information may be applied for spatial and positional awareness tracking, monitoring position of a child, a senior, or a patient. In some embodiments, the WPD device 200 may connect to one or more external devices (for example, other WPD devices), synchronize with the one or more external devices in real time, tracks a geographical location of the one or more external devices in real time, and provide communication capabilities using an embedded emergency button configured to give a medical alert signal, a request for help signal, or another informational signal. Thus, users may track geographical location of each other. Additionally, the WPD device 200 may include a three-dimensional motion sensor containing an Advanced RISC Machine (ARM) processor. The three-dimensional motion sensor may be associated with boxing, fencing, basketball, bowling, and other sports played with hands.

Additionally, the WPD device 200 may include one or more internal sensors configured to monitor user movements in a three-dimensional trajectory, identify user activities, identify a specific motion fingerprint of an exercise, evaluate user physical form, count repetitions, calculate calories burned, and measure user success.

Additionally, the WPD device 200 may be configured to control home appliances and applications through gestures; recognize gesturing of letters in the mid air as a text; settle payment of bills in one action by making a single gesture; detect incoming transmissions and/or alerts through built-in vibration and light-emitting diodes; use GPS, or iBeacon, or a Bluetooth low energy beacon to make payments at participating retail stores, restaurants, and make person-to-person payments; make direct payment by tracking a number with a finger; and make payments by gesturing a checkmark.

Additionally, the WPD device 200 may include an alert unit (not shown) configured to alert the user about one or more events by vibration and/or sound. For example, the WPD device 200 notify the user about incoming messages and/or data, remind to take pills, alert the time when blood pressure and glucose level of the user are high, remind to make exercises, serve as an alarm clock, and so forth.

In some embodiments, the WPD device 200 may further comprise one or more subscriber identification module (SIM) cards that can be used for connectivity and other purposes. Also, the WPD device 200 may include one or more additional memory units to expand storage capacity of the device. In some embodiments, the WPD device 200 may offer options for expandable memory by including a physical interface configured to receive memory devices external to the device. In some embodiments, the physical interface may include an external miceSecureDigital (microSD) slot. Aside from microSD slot, the WPD device 200 may provide for adding an external memory device using other interfaces such as, for example, MultiMediaCard (MMC), SD, miniSD, Firewire, and others.

Moreover, a two way radio transceiver (not shown) may be included in the WPD device 200 for communication and personal emergency response as well as entertainment use.

To provide for giving an alarm signal in case of danger or when help is needed, the WPD device 200 may comprise an emergency button. The emergency button may be used by children, seniors, patients, and so forth. The alarm signal may comprise a signal sent to an external device connected with the WPD device 200, a sound signal generated by the WPD device 200, a light signal, another signal, or a combination of them.

In some example embodiments, the WPD device 200 may further comprise a microphone (not shown). The microphone may be configured to sense voice data and transmit the voice data to the processor for processing. The voice data may include a voice command, a voice memo, a voice message, and so forth. Thus, a user may give voice commands to the WPD device 200, for example, when jogging, record voice memos, send voice messages, and so forth.

In some embodiments, the WPD device 200 may be waterproof, dust-proof, and/or shock-proof.

To facilitate user interaction with the WPD device 200, the expandable display 208 may be expanded, thus enlarging the display space. Display expanding may be performed by flipping-up a portion of the expandable display 208 as illustrated by FIG. 3.

In this embodiment, the display may include a basic display 302 and a flip up display 304. The basic display may be immovably fixed to the band, while the flip up display 304 may be displaceable between an open position 310 and a closed position 320.

In the open position 310, the flip up display 304 may expose the basic display 302. The inner portion of the flip up display 304 and the basic display 302 may form a common display space. The user may interact with the device via the common display space through touch.

In the closed position 320, the flip up display 304 may hide the basic display 302 so that the user can see only an outer portion of the flip up display 304. In the closed position 320, data may be represented on the outer portion of the flip up display 304, and the user may interact with the WPD device 200 via the outer portion through touch. The expandable display in the closed position may be substantially 85 millimeters to 54 millimeters.

Figure 4:
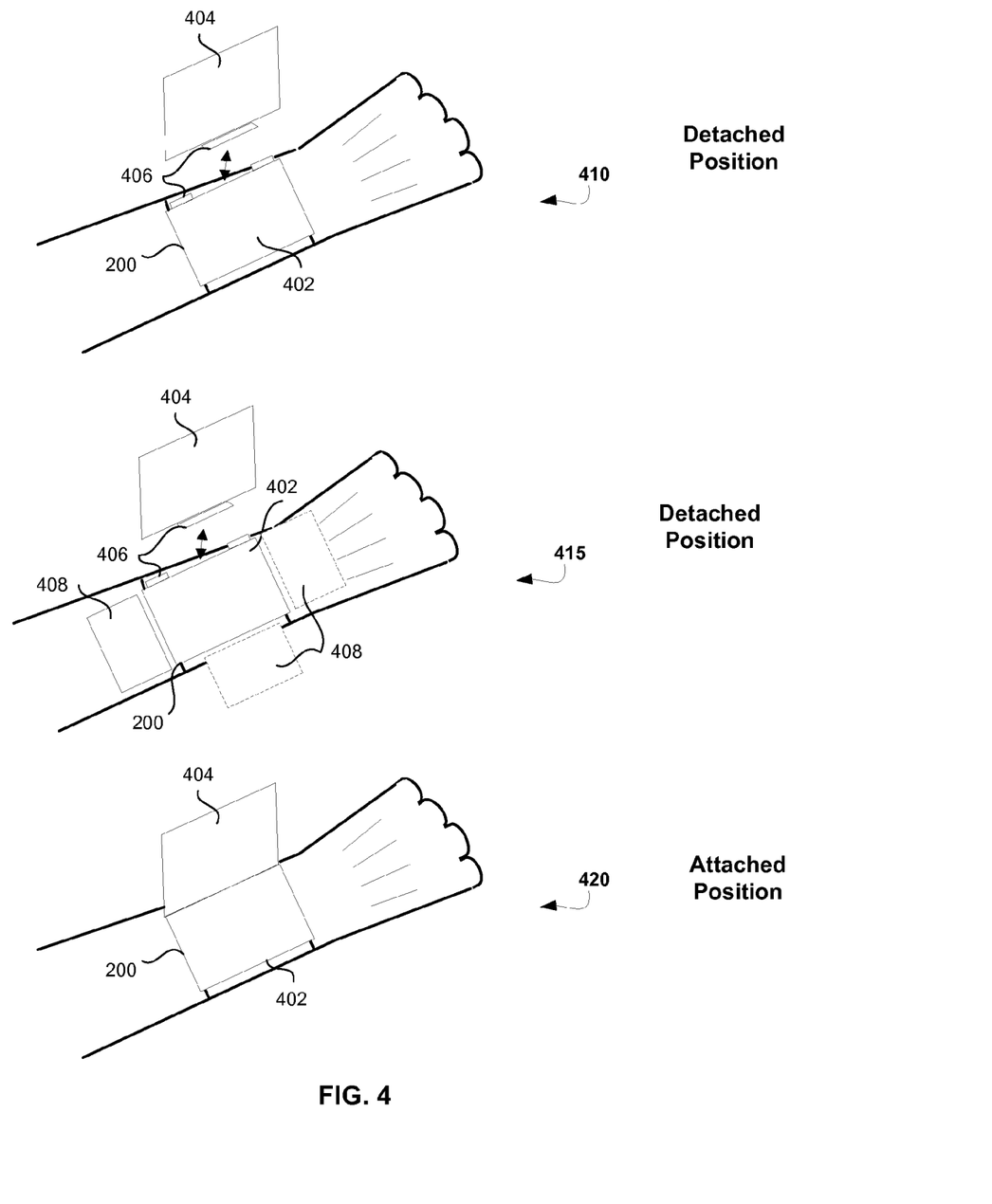
FIG. 4 illustrates an example of a detachable expandable display of the wearable personal digital device, in accordance with some embodiments.

In other embodiments, display expanding may be performed by connecting a detachable portion of the display as illustrated by FIG. 4.

The WPD device 200 may have a basic display 402 permanently mounted in the housing. Additionally, a detachable display 404 may be attached to the WPD device 200 to expand the display. The basic display 402 and the detachable display 404 include matching fixing elements 406. The fixing elements 406 may be configured to attach the detachable display 404 to the basic display 402.

In the detached position 410, the basic display 402 may function independently. The data transmitted by the processor may be represented on the basic display 402 and user commands given through touch may be received. The detachable display 404, when not attached to the WPD device 200 may be used as a standalone device for calculation, electronic payments, and so forth.

In some embodiments, as represented on the detached position 415, the WPD device 200 may have a credit card-sized display 408. The credit card-sized display 408 may have a magnetic stripe (not shown) and integrated circuit (IC) card reader (not shown). The credit card-sized display 408 may be adapted to wirelessly couple to a front, rear, left side or right side of the basic display 402.

In the attached position 420, the detachable display 404 may form a common display space with the basic display 402 and serve as an additional display portion. In the attached position 420, the processor may transmit and receive data associated with the common display space.

In some embodiments, the size of the detachable display 404 may be substantially 80 to 85 millimeters in length, 54 millimeters in width, and 0.84 millimeters thick or big dimensions. For example, the detachable display 404 maybe approximately the size of a credit card.

Though FIG. 4 shows attaching the detachable display 404 to a rear part of the basic display 402, the detachable display 404 may be attached alternatively. For example, the detachable display 404 may be attached in the front part of the basic display 402.

In some embodiments, the expandable or detachable display 404 is a connected standalone device that can hold and behave like a smart card, a proximity card, an IC card, a magnetic strip card, or an electronic or virtual payment card. The expandable display card can store data of debit cards, credit cards, gift cards, loyalty cards, membership cards, prepaid cards, and so forth. Instead of carrying several cards, the user can only carry the WPD. Adding a card to be stored by the expandable display requires a few steps. The user takes a picture of the front of the card and the back of the card, swipes the card through a swipe card reader of wearable device, and verifies that he is the cardholder by entering a verification code, providing a finger print, and so forth. When the user desires to use a card, he can select one of the cards from the list of cards stored by the WPD. When the card is selected, the expandable display shows the pictures of the card. For example, the expandable display can show the picture of the front of the card on one side and the picture of the back of the card on the other side. In some embodiments, the expandable display can further include a processor configured to manage and synchronize the card data.

The card data stored by the expandable display can include a card organization, a card number, a card expiration date, a card security code, a card holder name, and the like.

In the detached position 410, the expandable display (or detachable display 404) can be used similar to a payment card in a consumer's wallet. For example, the expandable display can be used with dip style card readers, for example, in automated teller machines (ATMs), at gas stations, restaurants, the mall, the gym, and so forth.

The expandable display can be charged from the WPD device 200, when the expandable display is in the attached position 420.

The expandable display can have an auto-lock feature that works based on proximity detected by a proximity sensor included in the expandable display or in another element of the WPD device 200. Thus, the expandable display can be detached, swiped, but does not allow to change which card is selected. In the event that the expandable display loses contact with the WPD device 200 for a certain period of time that can be set by the user, the expandable display can automatically deactivate itself.

In some embodiments, integrity of the expandable display card data can be ensured using 128-bit or 256-bit encryption for all storage and communication. Additionally, the expandable display can alert user in the event that the detached expandable display is outside a proximity zone, automatically disable certain device functions based on proximity to the WPD device 200, or fully deactivate itself based on the period of time the expandable display has been away from the WPD device 200.

In some embodiments, the WPD device 200 may be configured as a mechanical hybrid smart watch.

Figure 5:
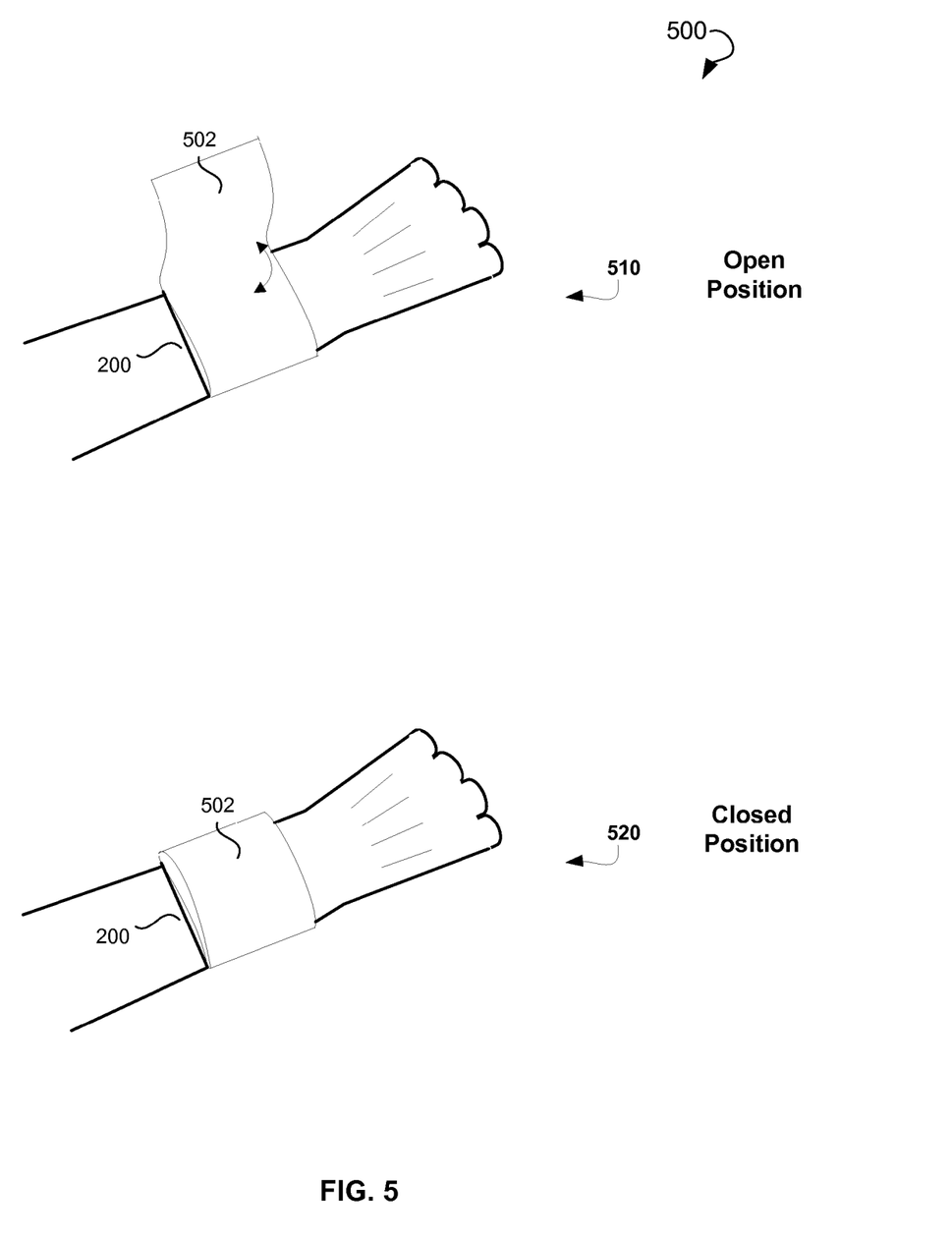
FIG. 5 illustrates an example of a bendable expandable display of the wearable personal digital device, in accordance with some embodiments.

Another variant of the display expanding is a bendable display 502 shown in FIG. 5.

The bendable display 502 may be mounted on the band of the WPD device 200. In some embodiments, a flexible power source may be connected to the bendable display 502 in a sandwich-like manner. The bendable configuration of the display and the power source may allow the WPD device to fold over 90 or more degrees like a sheet of paper or to roll up into a scroll. The bendable display 502 may be folded at least 110,000 times without creasing. The bendable display 502 may be folded in half; in three parts, where two side parts cover, from sides, a central part of the device; or in three parts, where all three parts are of the same width and a first side part covers a central part and a second side part covers the first side part. The thickness of the flexible display and the flexible power source may be approximately 0.1 mm to 2.5 mm.

The flexible configuration of the bendable display 502 may allow the user to fold the bendable display 502 from an open position 510 in a closed position 520 when the user is not using the WPD device 200 and unfold and employ the device when desired. For example, to make a call, the user may unfold the bendable display 502 to the open position 510. In the open position, the bendable display may provide enlarged display space to improve user experience.

In some embodiments, the bendable display 502 may replace the band. To secure the WPD device 200 on a wrist, the user may fold the bendable display 502 around the wrist.

Being worn on a part of human body or clothes due to its flexible configuration, the WPD device 200 may provide for convenient carrying in many situations and environments, such as physical activity, sports, travels, leisure time, and so forth.

In some embodiments, the WPD device 200 may be compatible with any third party application, and may comprise an application programming interface (API), and a software development kit (SDK).

Figure 6:
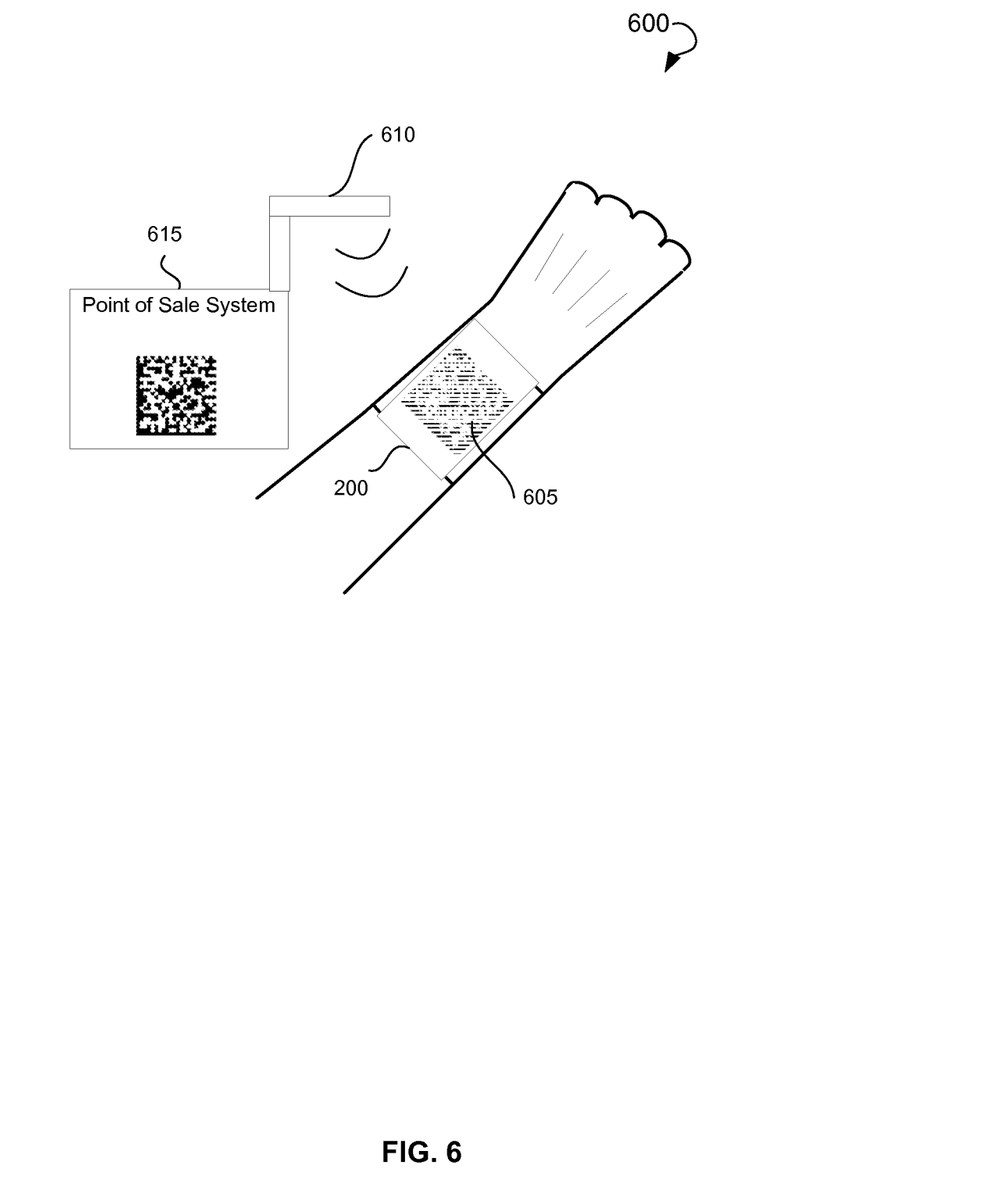
FIG. 6 illustrates an example of a wearable personal digital device scannable by a Point-of-Sale system, in accordance with some embodiments.

In an example embodiment, the WPD device may be adapted to be scanned by a POS system. FIG. 6 shows a schematic representation 600 of scanning a barcode 605 displayed on the WPD device 200 by a barcode scanner 610 of the POS system 615.

Figure 7:
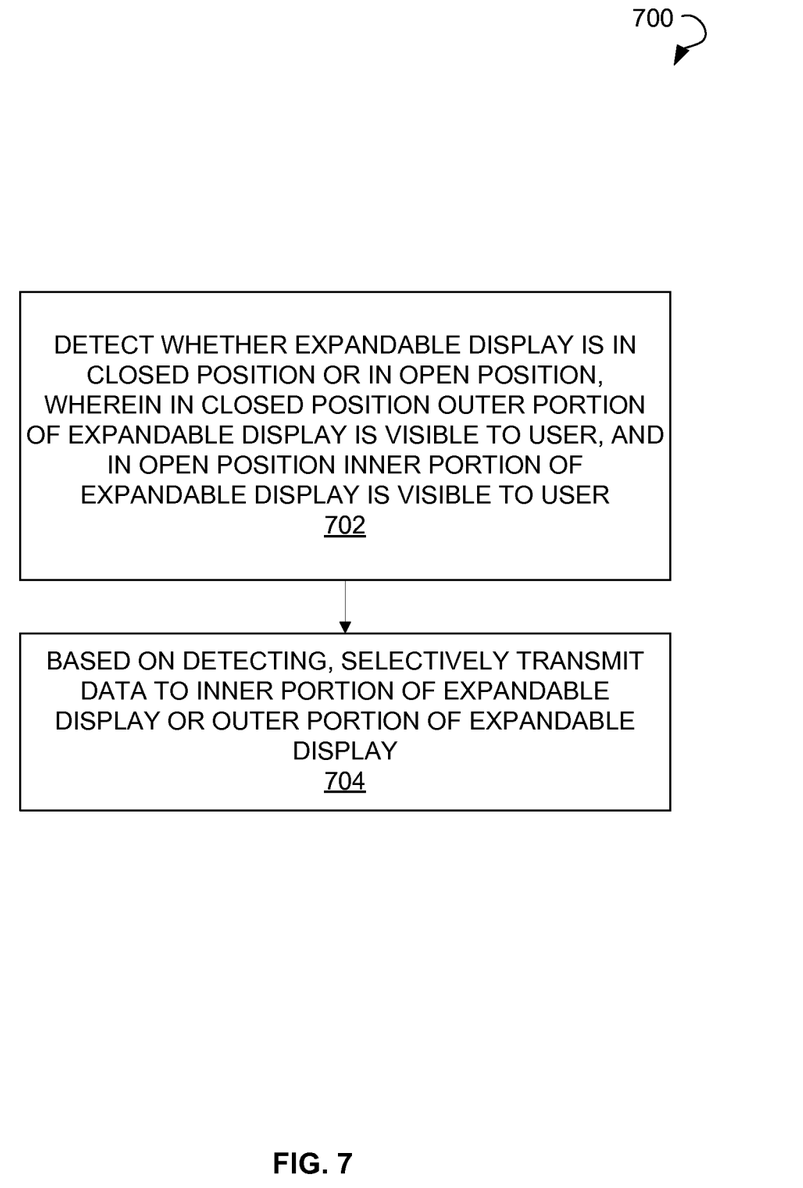
FIG. 7 is a flow chart illustrating a method for enlarging display space using a wearable personal digital device, in accordance with certain embodiments.

FIG. 7 is a flow chart illustrating a method 700 for enlarging display space using a WPD device with an expandable display, in accordance with certain embodiments. Method 700 may start with detecting whether the expandable display is in a closed position or in open position at operation 702. Depending on the position of the expandable display different portions of the display may be visible to the user. For example, in case of a flip-up display, an outer portion of the display may be visible in the closed position, while in the open position, the user can see the inner portion. Based on the detecting, data may be selectively transmitted to the inner or outer portion of the expandable display at operation 704. Thus, if it is detected that the expandable display is in the open position, the data may be transmitted to the inner portion of the expandable display. If it is detected that the expandable display is closed, the data may be transmitted to the outer portion. In such a way, the data may be transmitted to the portion of the display that is visible to the user at that moment. The size of the expandable display in the closed position may be, for example, about 85 millimeters to 54 millimeters.

The expandable display may include a flip up display, a detachable display, a bendable display, and so forth.

In some embodiments, the method 700 may optionally comprise projecting a virtual display on a surface using a projector The WPD device may be configured to monitor health and activity, in accordance to some embodiments. Biometric parameters of the user may be sensed by one or more biometric sensors. The biometric sensors may include sensors for measuring one or more of the following: a blood pressure, a pulse, a heart rate, a glucose level, a body temperature, an environment temperature, arterial properties, and so forth. The results of the measuring may be shown on the display and/or stored to the memory of the device to track pressure changes. The biometric parameters of the user may be processed by the processor to provide data on estimated trends of some parameters, such as progress bars, graphs, charts, and so forth.

In some embodiments, the WPD device may be configured to provide good habits charts capabilities. Such charts may enable the user to set a goal (e.g. eat healthy food, make one's bed in the morning, and so forth) and view progress in its achieving by registering events that comply with the goal set. The goals set, progress and/or results may be sent to a social networking service to share and get feedback. If an event complying with the set goal is not registered, the WPD device may give an alert signal, for example, by vibration, sound, light, and so forth.

In some embodiments, data related to biometric parameters of the user may be transmitted wirelessly to one or more external devices and/or online services.

In some embodiments, the WPD device adapted to monitor health and activity may be configured to continuously monitor biometric parameters of the user and produce an alarm or otherwise notify the user when one or more of the biometric parameters exceed predetermined limits.

Additionally, the WPD device may be configured to display health and activity data associated with the user. On a user request, the WPD device may measure various biometric parameters of the user, display the biometric parameters on the display of the WPD device, and/or store the measured parameters in the memory. The biometric parameters may be processed to receive summary data.

Thus, various devices with expanded display and methods for enlarging display space have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A wearable personal digital device, the device comprising:
   a processor;
   a memory unit communicatively coupled to the processor;
   a basic display device, permanently mounted to the device and communicatively coupled to the processor, the basic display device having a first display space;
   a detachable display device, communicatively coupled to the processor, the detachable display device having a second display space and configured to expand the first display space by operably coupling the second display space with the first display space;
   a credit card-sized display device having a magnetic stripe and integrated circuit (IC) card reader, wherein the credit card-sized display device is configured to wirelessly couple to a front, rear, left side or right side of the basic display device;
   a camera communicatively coupled to the processor;
   a display projector communicatively coupled to the processor;
   a communication circuit communicatively coupled to the processor and configured to connect to a wireless network and to communicate with one or more external devices;
   a swipe card reader communicatively coupled to the processor and configured to read data of a payment card, the data being transmitted to the processor;
   one or more biometric sensors to sense biometric parameters of a user, the biometric parameters being stored to the memory and processed by the processor to receive historical biometric data;
   one or more accelerometers to track activity of the user, the activity of the user including calories burned, sleep quality, breaths per minute, snoring breaks, steps walked, and distance walked;
   a housing adapted to enclose at least the processor, the memory unit, the basic display device, the detachable display device, the camera, the display projector, and the communication circuit, wherein the housing is waterproof and dust-proof; and
   a band adapted to secure the device on a human body, the human body including a wrist, an arm, a neck, a head, a leg, a waist, an ear, a finger, and any other part of the human body, wherein the band is adapted to secure the device under, within or on clothing, wherein the band includes a rechargeable battery configured to power the device,
   wherein the device comprises a smart watch.

2. The device of claim 1, wherein the basic display device is a touchscreen display configured to enable user interaction with the wearable personal digital through touch, and wherein the basic display device further includes a flip up display, the flip up display displaceable between an open position and a closed position, the flip up display in the open position exposing the basic display device, and the flip up display in the closed position hiding the basic display device, wherein the basic display device and the flip up display form a common display space.

3. The device of claim 1, wherein the basic display device and the detachable display device include matching fixing elements, the fixing elements configured to attach the detachable display device to the basic display device, wherein the basic display device and the detachable display device form a common display space in an attached position.

4. The device of claim 1, wherein the basic display device includes a bendable display, the bendable display being configured to bend from an open position to a closed position, the bendable display in the open position providing an expanded display space, and the bendable display in the closed position providing a reduced display space.

5. The device of claim 1, wherein the communication circuit includes one or more of the following: a wireless transceiver, a Bluetooth module, a WiFi module, a communication port, including a universal serial bus (USB) port, a parallel port, an infrared transceiver port, a radiofrequency transceiver port.

6. The device of claim 1, further comprising one or more control elements to control operation or functions of the wearable personal digital device, and wherein access to the device is controlled by one or more of the following: a password, a Personal Identification Number (PIN) code, and biometric authorization, the biometric authorization including fingerprint scanning, palm scanning, face scanning, and retina scanning, wherein the scanning is performed using the one or more biometric sensors, wherein the one or more biometric sensors include sensors for measuring one or more of the following: a blood pressure, a pulse, a heart rate, a glucose level, a body temperature, an environment temperature, and arterial properties, the measuring shown on the display, the device further comprising a fingerprint reader configured to scan a fingerprint, the scanned fingerprint being matched to one or more approved fingerprints, wherein access to the wearable personal digital is granted based on the matching.

7. The device of claim 1, wherein the camera is further configured to capture one or more barcodes, the one or more barcodes including electronic key data, a link to a web-resource, a payment request, advertising information, and other information, wherein one or more barcodes include a linear dimensional code, a two-dimensional code, a snap tag code, and a QR code, and other machine readable code.

8. The device of claim 1, wherein the device charges using one or more of the following: one or more solar cells disposed on an outer surface of the band, natural movement vibrations, and a wireless charger accessory.

9. The device of claim 1, wherein the device synchronizes with the one or more external devices in real time, tracks a geographical location of the one or more external devices in real time, and provides communication capabilities using an embedded emergency button configured to give a medical alert signal, a request for help signal, or another informational signal.

10. The device of claim 1, wherein the device controls snoring by sensing a position of the user using the one or more accelerometers.

11. The device of claim 1, wherein the device communicates with an external device to manage at least the data of the payment card,
wherein the device is adapted to enable a Bluetooth low energy payment,
wherein the device is associated with one or more of a transactional payment based on Unstructured Supplementary Service Data (USSD), Short Message Service (SMS), direct operator billing, a credit card mobile payment, an online wallet, a QR code payment, contactless near field communication, a cloud-based mobile payment, an audio signal-based payment, a Bluetooth Low Energy (BLE) signal beacon payment, an in-application payment, an SDK payment, an API payment, a social networking payment, and a direct carrier and bank co-operation.

12. The device of claim 1, wherein the device is compatible with one or more of the following network standards: GSM, CDMA, LTE, IMS, Universal Mobile Telecommunication System (UMTS), RFID, 4G, 5G, 6G and upper.

13. The device of claim 1, further comprising an operating system executing on the processor, the operating system including Android, iOS, Firefox OS, wearable OS, and other operating systems.

14. The device of claim 1, the device further comprising one or more of the following:
a GPS module configured to track geographical location of the device;
an alert unit configured to alert the user about one or more events by one or more of the following: vibration and sound;
one or more subscriber identification module (SIM) cards;
one or more additional memory units;
a physical interface configured to receive memory devices external to the device, wherein the physical interface includes a microSecureDigital (microSD) slot;
a two-way radio transceiver for communication purposes;
an emergency button configured to send an alarm signal;
a three-dimensional motion sensor containing an Advanced RISC Machine (ARM) processor, the three-dimensional motion sensor being associated with boxing, fencing, basketball, bowling, and other sports played with hands; and
a microphone configured to:
sense voice data, the voice data including a voice command, a voice memo, and a voice message; and
transmit the voice data to the processor.

15. The device of claim 1, wherein the device is metal-banded, leather banded, plastic-banded, or jewelry-banded, rimmed by jewelry and diamonds on a bezel, rimmed by jewelry and diamonds on an edge of the display, wherein the band is a flexible band including at least silicon polymer and stainless steel, the silicon polymer and stainless steel being hypoallergenic, lightweight, and wear-resisting, the band being configured to adjust a band size for snug engagement, wherein the band is adapted to be filled with air to perform blood pressure measuring and includes a pressure adjustment device, and wherein the band is detachable and changeable with an additional band including an additional battery.

16. The device of claim 1, wherein the processor is configured to:
process biometric data of the one or more biometric sensors and the one or more accelerometers to act as one or more of the following: a workout tracker to track physical activity of the user, a sleep monitor to analyze user sleep pattern, a fertility calendar to detect ovulation using temperature data from a temperature sensor, a silent alarm clock to wake up the user through vibration, a temperature monitor to provide notification when a body temperature of the user exceeds a predefined threshold, a heart keeper to detect irregular heart rate and provide a notification on the irregular heart rate, a gold trainer to analyze a shot of the user, a tele-health monitor to provide the biometric data to a physician associated with the user, a marathoner monitor to detect potentially fatal heat strokes, and a blood oxygen monitor to calculate blood oxygen saturation of the user; and provide biometric data of the one or more biometric sensors and the one or more accelerometers to a fitness application associated with the wearable personal digital device, wherein the fitness application includes instructions to monitor and store the biometric data, process the biometric data to provide the biometric data in a visual form, wherein the one or more biometric sensors include at least two light beams and an electro-optical cell to detect heart rate of the user, and wherein biometric data is transmitted to a client device of the user, wherein the client device analyzes the biometric data.

17. The device of claim 1, wherein the rechargeable battery includes a flexible battery, a plurality of button batteries, a curved battery, a stepped battery, and a cable battery, wherein the flexible battery includes nanoparticles in a semi-solid paste, a thin-film lithium-ion battery, a sodium ion battery with flexible molybdenum disulfide electrodes.

18. The device of claim 1, wherein the device comprises one or more internal sensors configured to monitor user movements in a three-dimensional trajectory, identify user activities, identify a specific motion fingerprint of an exercise, evaluate user physical form, count repetitions, calculate calories burned, and measure user success.

19. The device of claim 1, wherein the device is configured to execute one or more of the following:
control home appliances and applications through gestures;
recognize gesturing of letters in the mid air as a text;
settle payment of bills in one action by making a single gesture;
detect incoming transmissions and/or alerts through built-in vibration and light-emitting diodes;
use GPS, iBeacon, or a Bluetooth low energy beacon to make payments at participating retail stores, restaurants, and make person-to-person payments;
make direct payment by tracking a number with a finger; and
make payments by gesturing a checkmark.

20. The device of claim 1, wherein the device is configured to execute one or more of the following:
capture, measure, and analyze a swing of a baseball player in a three-dimensional space and record approximately 1000 data points per second;
measure the speed of the swing;
detect the shape of the swing and view the position of a bat in three-dimensional space from any angle;
measure time and efficiently of the bat staying in the potential contact area;
capture the angle of the bat at impact and the area in a hitting zone where the baseball player makes contact with a ball;
spin around and analyze the swing plane in 360° from any angle, see a top down view of the bat contacting the ball;
measure one or more aspects of the swing and discover what the baseball player does well and what the baseball player needs to work on;
save a compete record of the swing without limitation of records in an application; and
compare any two swings.

21. The device of claim 1, the device is configured to execute one or more of the following:

capture, measure, and analyze a swing of a golf player in a three-dimensional space and record approximately 1000 data points per second;
evaluate the quality of a swing and measure the degree of achieving a personal swing goal;
track the speed of a club head and hands traveling at impact;
detect the shape of the swing in a three-dimensional space and compare the path of a backswing to a downswing;
detect a club path and hand path;
measure the ratio of time it takes to make the backswing versus the downswing;
measure the angle of the club shaft at the top of the backswing; and
measure the rotation of hips.

22. The device of claim 1, the device is configured to execute one or more of the following:
capture, measure, and analyze a swing of a tennis player in a three-dimensional space and record approximately 1000 data points per second;
track the amount of forehands, backhands, serves and smashes;
measure the power generated by the tennis player with each stroke and detect his trends for an entire match or practice session;
track the number of topspin, slice and flat shots the tennis player hits by a forehand, backhand and serve;
track the total amount of time the tennis player spends on a court and the active time he spends playing points;
provide an overview of a match and practice performance and show a playing style emerge;
measure the power the tennis player generates with each shot and detect how the power changes; and
track the percentage of topspin, slice and flat shots the tennis player hits by forehand, backhand and serve,
wherein the device is compatible with a third party application,
wherein the device is associated with one or more of an application programming interface (API) and a software development kit (SDK), and
wherein the device is adapted to be scanned by a Point-of-Sale (POS) system.

23. An expandable standalone display configured to act as one or more of a smart card, a proximity card, an IC card, a magnetic strip card, and an electronic payment card, the electronic payment card storing card data of one or more debit cards, credit cards, gift cards, loyalty cards, prepaid cards, and membership cards, wherein the expandable standalone display is configured to attach to a wearable personal digital device, wherein the wearable personal digital device includes the wearable personal digital device of claim 1.

24. The expandable display of claim 23, wherein the expandable display is substantially 80.5 millimeters in length, 54 millimeters in width, and 0.84 millimeters thick or big dimensions and is configured to:
detach, wherein the expandable display is compatible with a dip style reader; and
charge when attached to the wearable personal digital device.

25. The expandable display of claim 23, wherein the expandable display is configurable to track time the expandable display is detached from the wearable personal digital device, and selectively lock the expandable display when the time the expandable display is detached exceeds a predefined period.

26. The expandable display of claim 23, wherein the expandable display includes a proximity sensor, the proximity sensor being configured to sense proximity to the wearable personal digital device, wherein the expandable display is configured to deactivate based on the proximity to the wearable personal digital device.

27. The expandable display of claim 23 configured to display the card data, wherein the card data includes at least a card organization, a card number, a card expiration date, a card security code, and a card holder name, and the expandable display comprises a processor configured to:
receive a front side picture of a card;
receive a back side picture of the card;
receive the card data, wherein the card data is received from a swipe card reader of the wearable personal digital device;
receive verification that a user is a cardholder;
manage and synchronize the card data; and
download applications, receive and send text, video, multimedia data.

28. A method for enlarging display space using a wearable personal digital device with an expandable display, wherein the expandable display is displaceable between a closed position and an open position, the wearable personal digital device including the wearable personal digital device of claim 1, the method comprising:
detecting whether the expandable display is in the closed position or in the open position, wherein in the closed position an outer portion of the expandable display is visible to a user, and in the open position an inner portion of the expandable display is visible to the user; and
based on the detecting, selectively transmitting data to the inner portion of the expandable display or the outer portion of the expandable display.

29. The method of claim 28, wherein the data is transmitted to the outer portion of the expandable display when the expandable display is in the closed position and the data is transmitted to the inner portion of the expandable display when the expandable display is in the open position, wherein the surface of the expandable display in the closed position being substantially 85 millimeters to 54 millimeters or big dimensions.

30. The method of claim 28, further comprising:
sensing biometric parameters of the user using one or more biometric sensors, wherein the biometric parameters include one or more of the following: a blood pressure, a pulse, a heart rate, a glucose level, a body temperature, an environment temperature, and arterial properties;
processing the biometric parameters using a processor;
showing the biometric parameters on the expandable display; and
projecting a virtual display on a surface using a projector.

* * * * *